Patented May 8, 1945

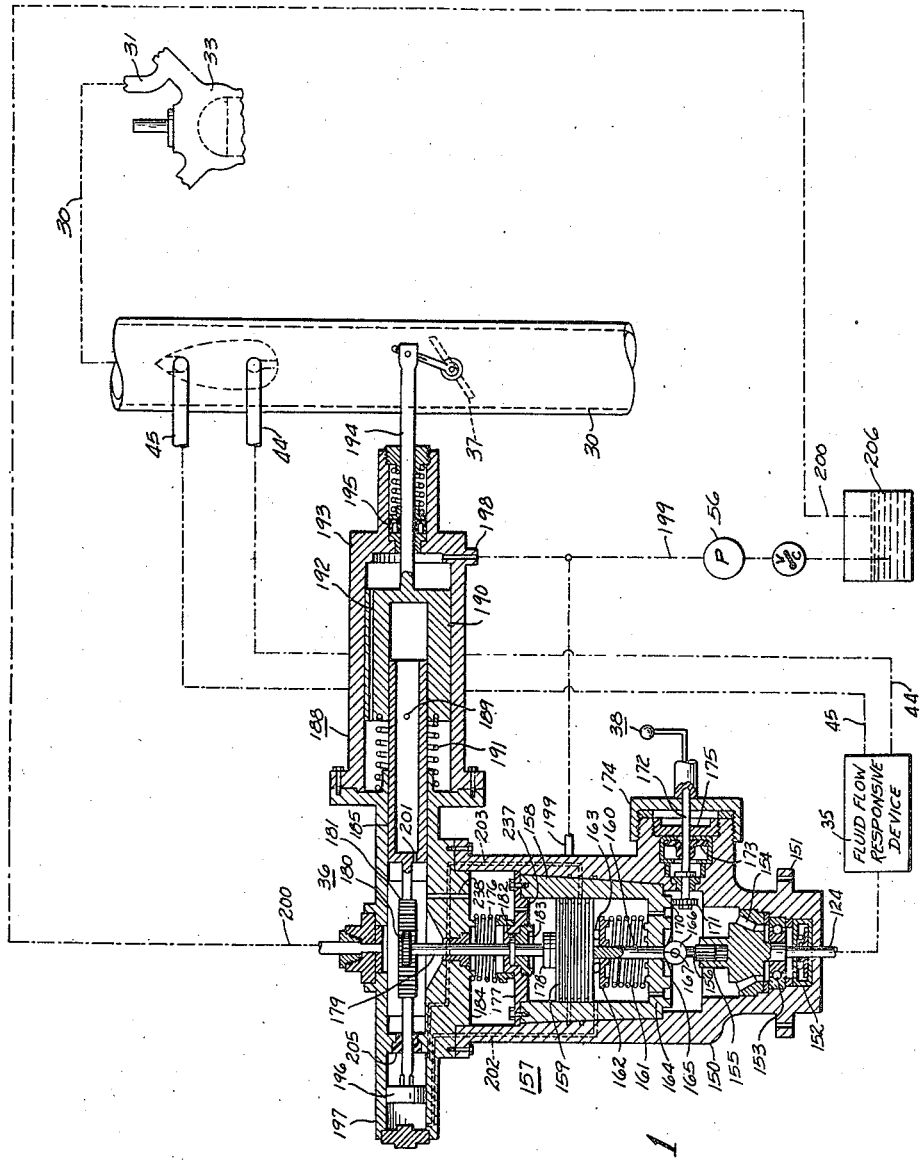

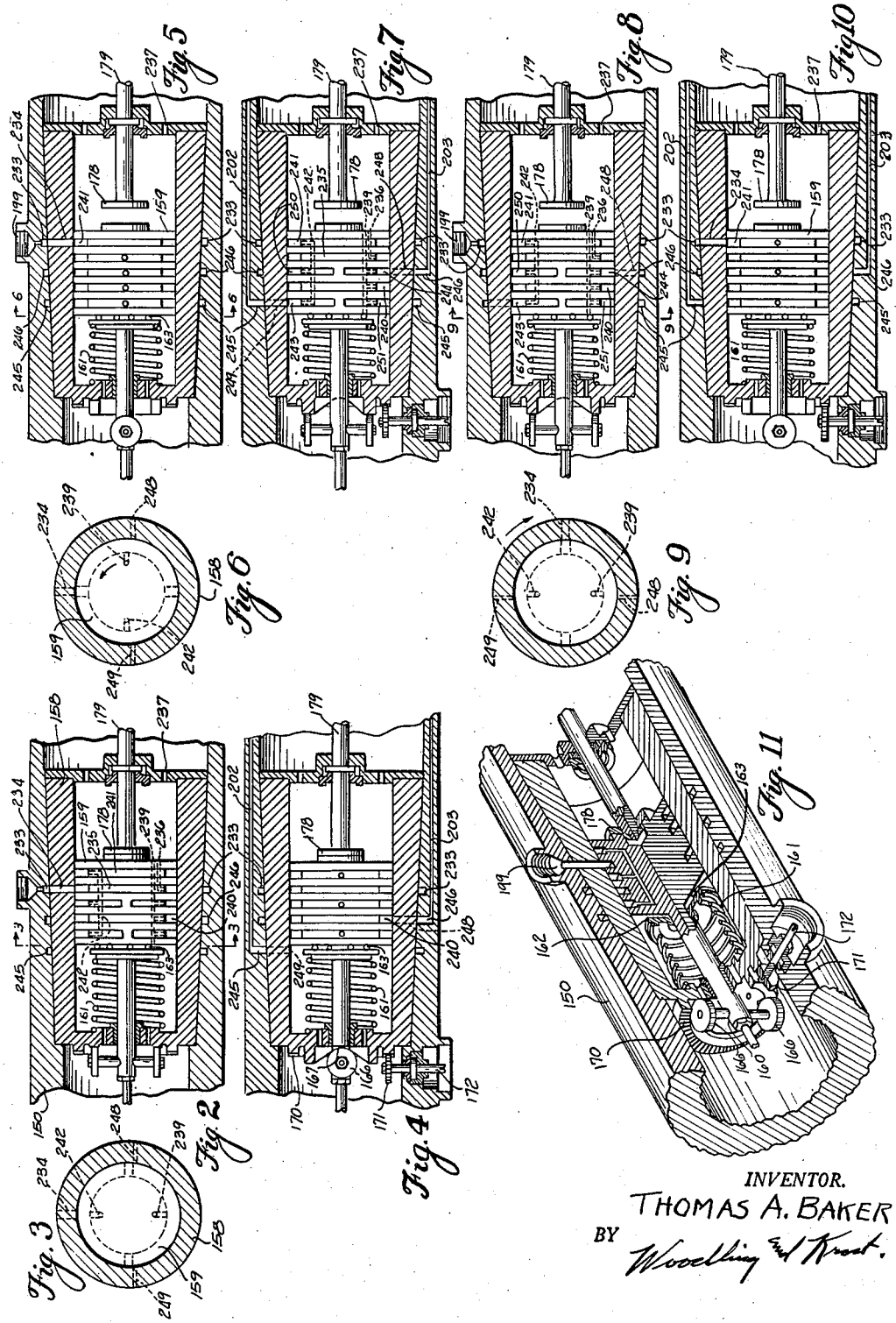

2,375,204

UNITED STATES PATENT OFFICE 2,375,204

FLUID MEASURING AND REGULATING MECHANISM

Thomas A. Baker, Logansport, Ind.

Application May 12, 1942, Serial No. 442,711

15 Claims. (Cl. 121—41)

My invention relates in general to a motion transmitting mechanism including a master valve which governs a resultant movement in response to a changed condition or to an operable controlled condition.

Although my invention will be described in connection with the provision of maintaining the flow of the fluid in a fluid passage at a predetermined value or setting, it is to be understood that it may be applied to govern the operation of any other condition.

An object of my invention is the provision of a motion transmitting mechanism arranged to maintain a resultant movement at a predetermined value, wherein the motion transmitting mechanism is responsive to the resultant condition as well as to an operable controlled condition.

Another object of my invention is the provision of transmitting the movement of an air flow responsive apparatus to a control vane or other control device in an air duct passage, whereby the quantity of the flow of air through the air duct passage may be maintained at a predetermined value or setting.

Another object of my invention is the provision of measuring the quantity of fluid which flows through a fluid duct passage and of maintaining the flow of fluid through the fluid duct passage at a predetermined value or setting.

Another object of my invention is the provision of a fluid control valve which depends for its operation upon both the movement of the piston valve within the casing and the movement of the casing with respect to the piston, and further wherein the movement of the piston is both reciprocating and rotary.

Another object of my invention is the provision of a motion transmitting apparatus arranged to control the flow of the air passing through an air duct passage or the liquid through a liquid duct passage in which the fluid pressure follower apparatus is governed by a pilot piston.

Other objects and a fuller understanding of my invention may be had by referring to the following description and claims, taken in conjunction with the accompanying drawings, in which like parts are designated by like reference characters and, in which:

Figure 1 is a cross-sectional view of the motion transmitting means which is responsive to the flow of air through a duct and which actuates the vane for governing the quantity of air passing through the air duct passage;

Figure 2 is a cross-sectional view of a valve for controlling the fluid in my motion transmitting means;

Figure 3 is an end view showing the angular relationship between the valve plunger and the valve casing taken along the line 3—3 of Figure 2 with the outside casing removed;

Figure 4 is a view of the valve shown in Figure 2 but looking down thereon;

Figure 5 is a view similar to Figure 2 but shows the plunger within the valve turned in a counter-clockwise direction for substantially 90 degrees;

Figure 6 is a cross-sectional view taken along the line 6—6 of Figure 5 with the outer casing removed;

Figure 7 is a view of the position of the valve shown in Figure 5 but looking down thereupon;

Figure 8 is a view similar to Figure 2 but with the inner casing rotated substantially 90 degrees in a clockwise direction;

Figure 9 is a cross-sectional view of Figure 8 taken along the line 9—9 with the outer casing removed;

Figure 10 is a cross-sectional view of the valve shown in Figure 8 but looking down thereupon; and Figure 11 is a perspective and cross-sectional view of the valve shown in Figures 2 to 10, inclusive.

In my invention the mechanism for determining the flow of fluid through the air or fluid duct 30 is indicated generally by the reference character 35. In Figure 1 of the drawings, the air duct 30 supplies air to the cylinder 33 of an internal combustion engine through a branch duct 31. Only one cylinder is illustrated but it is to be understood that the air duct 30 leads to the other cylinders of the engine. Any suitable means for establishing air under pressure may be employed to supply the air duct 30.

The resultant movement of the fluid flow responsive device 35 is transmitted through a shaft 124 to a motion transmitting means indicated generally by the reference character 36 which controls the position of the control vane 37 in the air duct 30. The motion transmitting means 36 is governed by a throttle device indicated generally by the reference character 38 which adjustably varies the amount of air passing through the air duct 30. Accordingly, through the combined action of the air flow responsive mechanism 35 and the motion transmitting means 36, the flow of air passing through the air duct 30 may be maintained at a definite predetermined value or setting as regulated by the throttle device 38. The fluid for operating the motion transmitting mechanism 36 is fed by a pump 56 from a supply tank 206 through a pipe 199. The fluid returns to the supply tank 206 through a return pipe 200.

The fluid flow responsive device 35 is responsive to the flow of fluid through the duct 30 and is connected to the fluid or air duct 30 by fluid tubes 44 and 45. The fluid flow responsive device 35 drives the motion transmitting device 36 through a shaft 124 and is arranged to govern the position of the control vane 37 within the conduit 30. In actual construction, the flange 151 on the lowermost portion of the housing 150 of the motion transmitting means 36 may be mounted on the fluid flow responsive device 35. As illustrated, a shaft seal 152 seals the housing 150 from the outside.

The upper end of the shaft 124 is arranged to be supported by a ball bearing 153 and the downward axial movement of the shaft 124 is opposed by a thrust bearing 154. Anchored to the upper end of the shaft 124 is a hollow spline 155 which slidably receives a shaft spline 156 to which is attached a shaft 160 that actuates a slidable and rotatable plunger 159 within a rotatable casing 158. The slidable and rotatable plunger 159 and the rotatable casing 158 constitute a pilot valve indicated generally by the reference character 157. The slidable and rotatable plunger 159 is urged upwardly by means of a spring 161 acting against a spring plate 162 which is constrained against the slidable and rotatable plunger 159 through ball bearings 163. By this construction the slidable and rotatable plunger 159 may rotate relative with the spring plate 162 without any friction because the ball bearings 163 provide a minimum amount of friction therebetween. The spring 161 upon its lowermost end rests against the bottom end 164 of the rotatable casing 158. The underneath side of the bottom end 164 is provided with an annular race way surface 165 against which rides two diametrically opposed rollers 166 which are carried by the shaft 160. The pilot valve 157 is shown in Figures 2 to 11, inclusive, and as there illustrated the annular race way surface 165 is provided with two diametrically opposed low points 167 into which the rollers 166 reside in their normal and neutral position. The underneath side of the bottom end 164 of the rotatable casing 158 is likewise provided with annular gear teeth 170 which are engaged by a gear 171 actuated by a shaft 172 driven through a flexible shaft 207 by the throttle device 38. The throttle shaft 172 is constrained against axial movement and is surrounded by a shaft seal 173 to keep the internal compartment of the pilot valve 157 sealed from the outside. The shaft seal 173 is held in place by means of a threaded lock nut 175. A threaded cap 174 protects the shaft seal and the lock nut 175 from outside exposure. The outside of the rotatable casing 158 is slightly tapered in a downward direction and fits into the housing 150 which likewise has a complementarily tapered internal surface to receive the rotatable casing. As shown, the rotatable casing is urged downwardly into the housing 150 by means of a spring 176 that has its lower end resting against the top end 177 of the rotatable casing 158. The upper end of the spring rests against a plate 184 that closes the upper end of the housing 150. Positioned on top of the slidable and rotatable plunger 159 is a clutch 178 having two disc parts which when engaged provide for restraining a shaft 179 which has a pinion gear 180 at the upper end thereof meshing with a member having rack teeth 181. The shaft 179 is provided with a thrust plate 182 formed integrally therewith or otherwise suitably connected thereto and the thrust plate 182 is arranged to prevent axial movement of the shaft 179. One side of the thrust plate rests in the recess formed in the top end 177 of the rotatable casing 158 and the other side of the thrust plate 182 rests against a threaded cap 183 threadably engaging the top end 177. The rack teeth 181 on the right-hand end thereof are connected to a plunger 185 having master or main valve openings 189 and the left-hand end of the rack teeth 181 is connected to a piston 196 which reciprocally moves within a cylinder 197. The plunger 185 controls the position or movement of a follower plunger 190 which is reciprocally mounted within a cylinder casing 193. The follower plunger 190 and the cylinder casing 193 together with the plunger 185 may be characterized as a fluid pressure follower device and is indicated generally by the reference character 188. The follower plunger 190 is connected to the control valve or vane 37 within the conduit 30 through means of an actuating rod 194. Surrounding the actuating rod 194 is a shaft seal 195 which keeps the fluid within the cylinder casing from leaking out to atmosphere. The follower plunger 190 is constrained to the right by means of a spring 191. Extending longitudinally of the follower plunger 190 is a restricted opening 192 which permits fluid to move from the right-hand end of the cylinder casing 193 to the left-hand end thereof. Fluid under pressure is admitted to the cylinder casing 193 through the fluid inlet 198. The master valve which comprises radial openings 189 in the plunger 185, provides for determining the position of the follower plunger 190 which actuates the control vane 37. In a stabilized position of the follower plunger 190 the fluid pressure acting against the left-hand end of the follower plunger together with the exertion of the spring 191 just balances the pressure of the fluid acting upon the right-hand end of the follower plunger. Now let it be assumed that the master valve openings 189 are moved to the left upon the movement of the plunger 185 to the left, then the fluid in the left-hand end of the cylinder casing 193 is permitted to escape through the master valve openings 189 and thence out through the opening 201 in the left-hand end of the plunger 185 to the exhaust fluid outlet 200 whereupon the fluid flows back to the supply tank 206 as shown in the diagrammatic view in Figure 1 of the drawing. The escape of the fluid from the left-hand end of the cylinder casing 193 through the master valve openings 189 causes a fluid pressure drop and as a consequence the follower plunger 190 is urged to the left by the fluid pressure in the right-hand end of the cylinder casing 193. The follower plunger 190 moves to the left until the left-hand end thereof aligns itself with the master valve openings 189 at which place the follower plunger again becomes stabilized. Under the condition that the master valve openings 189 should be moved to the right, in which event the fluid within the left-hand end of the cylinder casing 193 is totally entrapped therein, then the pressure within the left-hand end of the cylinder casing 193 together with the force of the spring 191 is greater than the pressure exerted by the fluid in the right-hand end of the cylinder casing 193 with the result that the follower plunger 190 moves to the right until the left-hand edge thereof again becomes partly aligned with the master valve openings 189. The movement of piston 190 follows the plunger 185 such that there is a constant tendency to equalize the forces tending to move piston 190 and present on the left and right of the said piston 190. The master valve openings 189 will seek an effective porting area such as to exhaust fluid at a rate sufficient to reduce the fluid pressure present in the left hand chamber and to the degree that the left hand force (fluid pressure plus spring pressure) shall equal the right hand force. Thus the porting area effective to control the pressure in the left-hand chamber is a partial open area which will balance the left and right opposing forces thus causing the follower plunger 190 to come to rest. Consequently, the movement of the follower plunger 190 follows the movement of the plunger 185, and the movement is such that the left-hand edge of the follower plunger 190 is always maintained in substantial alignment with the master valve openings 189. When the pilot valve 157 is in its neutral or normal position, that is, the position when the rollers 166 are residing in the low points 167 of the annular race way surface 165, the two engaging discs of the clutch 178 hold the plunger 185 in a fixed position through the pinion gear 180 and the rack teeth 181 with the result that the control vane 37 within the air duct 30 is maintained in a fixed position for controlling the flow of the air to the internal combustion engine.

The pilot valve 157 controls the position of the plunger 185 by governing the flow of the fluid which is admitted to opposite sides of the piston 196 within the cylinder 197. Fluid is admitted under pressure through the fluid inlet 199 to the pilot valve 157 and through control ports within the pilot valve 157 fluid is admitted to or exhausted from the cylinder 197 through the fluid ducts 202 or 203. The control of the fluid through the ports within the pilot valve 157 may best be explained by reference to figures 2 to 11, inclusive, which show cross-sectional views of the pilot valve for the various positions which it is caused to assume by the rotation of the shaft 124 from the air measuring mechanism 35 or by the shaft 172 from the throttle device 38. The right-hand end of the cylinder 197 is sealed about the shaft by means of a shaft unit 205. In the operation of the pilot valve it is to be remembered that the rotatable casing 158 is arranged to be rotated with reference to the slidable and rotatable plunger 159 by means of the gear 171 actuated by means of the throttle device 38, and further it is to be remembered that the slidable and rotatable plunger 159 is both reciprocated and rotated with reference to the rotatable casing 158 through means of the shaft 124 which is governed in its rotation by the air flow responsive mechanism 35. The Figure 2 shows a cross-sectional view of the pilot valve which is perpendicular to the view shown in Figure 1 and the Figure 4 shows a cross-sectional view in the same plane as that shown in Figure 1, and both views, Figures 2 and 4, show the neutral position of the valve parts. The Figure 3 is a cross-sectional view taken along the line 3—3 of Figure 2 but the outside housing 150 is removed, the main object in showing the Figure 3 is to show the relative angular position of the slidable and rotatable plunger 159 with respect to the rotatable casing 158. In the neutral position of the pilot contral valve 157 as shown in Figures 2, 3 and 4, fluid is admitted through the fluid inlet 199 whereupon it flows to an annular groove 233 provided in the housing 150. The rotatable casing 158 is provided with an opening 234 which admits the fluid to flow into the annuar groove 235 around the slidable and rotatable plunger 159. From the annular groove 235 fluid flows through a port 236 into the space upon the right-hand end of the slidable and rotatable plunger 159, after which the fluid may flow through the opening 237 in the top end 177 of the rotatable casing 158 and thence through the opening 238 out through the fluid outlet 200 whereupon the fluid flows to the supply tank 206, see Figures 1, 2 and 4. From the compartment on the right-hand end of the slidable and rotatable plunger 159 the fluid may flow through the port 239 to the left-hand end of the slidable and rotatable plunger 159 and then out through a port 249 in the rotatable casing 158 to an annular groove 245 in the housing 150, after which the fluid flows through the duct 202 to the left-hand side of the piston 196. Fluid may also flow to the right-hand side of the piston 196 through a fluid circuit which may be traced as follows: beginning with the port 239 which extends longitudinally through the slidable and rotatable plunger 159, fluid flows into the annular groove 240 and a hole 248 to an annular recess 246 in the housing 150 after which the fluid flows through the duct 203 to the right-hand side of the piston 196. There is substantially no pressure of the fluid on opposite sides of the piston 196 when the pilot valve 157 is in its neutral or normal position since the fluid may exhaust through the fluid outlet 200. Accordingly, in the neutral or normal position the rack teeth 181 and the pinion gear 180 through the engagement of the clutch 178 hold the plunger 185 in a fixed position which in turn means that the control vane 37 in the duct 30 is held in a fixed position.

Now let it be assumed that the shaft 124 which is governed by the air flow responsive mechanism 35 causes the rollers 166 to be turned in a counter-clockwise direction, thereby turning the slidable and rotatable plunger 159 in a counter-clockwise direction as shown in Figure 6 of the drawings. As the rollers 166 are turned in a counter-clockwise direction they turn on the annular race way surface 165 and as they leave the low point 167 they constrain the slidable and rotatable plunger 159 to the left against the spring 161 and at the same time separate the two disc plates of the clutch 178 which permits the free turning of the pinion gear 180 and the free movement of the rack teeth 181, so that the plunger 185 may be actuated by the piston 196. Under the above assumed condition, fluid is admitted to the left-hand side of the piston 196 for actuating the plunger 185 to the right which means that the follower plunger 190 is likewise hydraulically moved to the right for moving the control vane 37 toward its closed position. Fluid flows to the left-hand side of the piston 196 through a fluid circuit which may be traced as follows: beginning with the fluid inlet 199 in Figure 5, fluid flows through the annular groove 233 and a hole 234 to the annular groove 241, after which fluid flows through the port 242 which extends longitudinally of the slidable and rotatable plunger 159 to a semi-annular groove 243 in the slidable and rotatable plunger 159, see Figure 7. From the semi-annular groove 243 fluid flows through a hole 249 in the rotatable casing 158 to the annular groove 245 after which the fluid flows through the duct 202 to the left-hand side of the piston 196 for urging the plunger 185 to the right. The fluid on the right-hand side of the piston 196 is exhausted through the outlet 200 to a circuit which extends from the right-hand side of the piston 196 through the duct 203 through the annular groove 246 in the casing 150, see Figures 1 and 7. From the annular groove 246 fluid flows through the hole 248 to the semi-annular groove 244 in the slidable and rotatable plunger 159, after which the fluid flows through the port 239 to the space on the right-hand end of the slidable and rotatable plunger 159, whereupon the fluid flows to the exhaust fluid outlet 200 through the openings 237 and 238, see Figure 1.

The movement of the piston 196 to the right through the fluid pressure follower mechanism 188 re-positions the control vane 37 which in turn changes the condition of the air flowing in the air duct 30. The repositioning of the control vane 37 is moved to such point that the air flow responsive mechanism 35 rotates the two rollers 166 clockwise back to the low point 167 in the annular race way surface 165 at which point the spring 161 urges the slidable and rotatable plunger 159 upwardly in Figure 1 and causes the two discs of the clutch 178 to re-engage for holding the plunger 185 in a fixed position through the pinion gear 180 and the rack teeth 181. Accordingly, the combined action of my air flow responsive mechanism, the pilot valve 157, and the fluid pressure follower mechanism 188 is such that in the event the flow of the air flowing through the duct 30 changes, the control vane is repositioned to cause the flow of air to be maintained at a predetermined value or setting as determined by the throttle device 38.

Under the condition that the quantity of air flowing through the duct 30 causes the air flow responsive mechanism 35 to rotate the shaft 124 in a clockwise direction thereby moving the slidable and rotatable plunger in a clockwise direction which is just the reverse from that shown in Figure 6, then the piston 196 is actuated to the left which in turn through the fluid pressure follower mechanism 188 opens the control vane 37 in the air duct 30. The flow of the fluid through the right-hand side of the piston 196 may be traced as follows: beginning with the fluid inlet 199, fluid flows through the annular groove 233, the hole 234, the annular groove 241 of the slidable and rotatable plunger 159 into the port 242, whereupon the fluid flows to the semi-annular groove 250, the hole 248, the annular groove 246, and the duct 203 to the right-hand side of the piston 196. As the piston 196 moves to the left the fluid in the left-hand end of the cylinder 197 is exhausted out through the fluid outlet 200 to a circuit which extends as follows: beginning with the left-hand end of the cylinder 197, fluid flows through the duct 202, the annular groove 245 in the housing 150, the hole 249 to the semi-annular groove 251 after which the fluid flows through the port 239 and the openings 237 and 238 to the fluid outlet 200. From the above description it is observed that the rotation of the slidable and rotatable plunger 159 in a counter-clockwise direction with reference to the rotatable casing 158 causes the piston 196 to be actuated to the right and the rotation of the slidable and rotatable plunger 159 in a clockwise direction with reference to the rotatable casing 158 causes the piston 196 to be actuated to the left. The change in the direction of the flow of fluid to take care of the two-way operation of the piston 196 is effected through the rotation of the slidable and rotatable plunger 159 whereupon the semi-annular grooves 243, 244, 250 and 251 are caused to be aligned with the holes 248 and 249 in the rotatable casing 158. The slidable movement of the slidable and rotatable plunger 159 takes care of matching of the annular grooves 235 and 241 in the slidable and rotatable plunger 159 with the port 234 of the rotatable casing 158. An annular groove 240 is provided between the semi-annular grooves so that fluid which escapes from the semi-annular grooves along the rotatable casing 158 may flow into the annular groove 240 and the port 239 to exhaust. The action of the master valve is such that the control vane 37 is governed to maintain the flow of the air through the air duct 30 at a predetermined value or setting as determined by the throttle 38. The movement of the throttle 38 to a new position rotates the gear 171 and shifts the angular position of the rotatable casing 158 with respect to the slidable and rotatable plunger 159, which in turn causes the pilot valve 157 to admit fluid to the cylinder 197 for re-positioning the control vanes 37 through the fluid pressure follower mechanism 188. The Figures 8, 9 and 10 show the relative position of the rotatable casing 158 and the slidable and rotatable plunger 159, after the rotatable casing 158 has been rotated in a clockwise direction as indicated by the arrow in Figure 9 by the throttle device 38. The rotation of the rotatable casing 158 with respect to the slidable and rotatable plunger 159 produces the same result so far as the alignment of the various grooves and ports in the pilot valve is concerned, as if the slidable and rotatable plunger 159 were rotated with reference to the rotatable casing 158. Upon the rotation of the rotatable casing 158 in one direction, fluid is admitted to the left-hand side of the piston 196 for closing the control vane 37 and upon the rotation of the rotatable casing 158 in the opposite direction the pilot valve admits fluid through the right-hand side of the piston 196 for opening the control vane 37. The effect produced by rotating the rotatable casing 158 is such as to change the setting of the pilot valve 157 to produce a corresponding re-positioning of the control vane 37.

The purpose of the clutch means 178 is two fold: (1) when shaft 124 is at rest it is the purpose of the clutch means to permit a mechanical holding function between 124 through 160, 159, 178, and to the rack 181 through pinion 180. This means that there is virtually a direct mechanical connection between the fluid flow responsive means 35 and the master actuator 188 which governs the valve member 37. This mechanical arrangement is incorporated to overcome the effects of static friction within the hydraulic cycle of the system through the hydraulic means 196 and 195. This permits the mechanism to exactly assimilate the indications of the fluid responsive device, (2) the clutching means 178 is broken almost instantaneously upon a movement in either direction of shaft 124. Thus the second purpose is evident, in that the assembly of the parts on the driven side of the clutch, namely, 178 through 179, 180, 181, 196, 185 to 37, all take up a new relation to the assembly of the parts on the driving side of the clutch, namely, 159 through 160 and shaft 124 down to the fluid flow member 35.

It is unique that as the assembly of the driven parts moves in one direction, for each function of the driving parts, the driving part moves in two directions. That is the driving parts rotate, for example, in first clockwise and then counter-clockwise direction or vice versa. This is a natural function since the sensing means 35 will indicate over or under the needs. Thus the indicator has traveled in one direction and initiated movement to the valve 37. It is then necessary for 35 to return to normal, which it does by travelling in a reverse direction. It accomplishes this because the member 37 is still moving in a consistent direction which is the same as that required to return the means 35 back to normal. Though the fluid flow responsive device 35 returns back to normal the position of valve 37 is new. The relation between the clutch members 178 and its opposite element connected to 159 is different than at the start of the cycle. The clutch permits a "rotating" effect between the assemblies of the driven and driving parts.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A fluid valve comprising, in combination, an external casing, a rotatable inner casing rotatively mounted in the external casing, and a slidable and rotatable plunger mounted in the rotatable inner casing, said casings and plunger having registering port means to control the flow of fluid therethrough, first means for rotating the inner casing relative to the slidable and rotatable plunger to vary the port registration, second means for sliding and rotating the plunger relative to the inner casing to vary the port registration said second means including rotary means for transmitting rotary movement to the slidable and rotatable plunger and reciprocal means responsive to the said rotary movement for transmitting a slidable movement to the slidable and rotatable plunger.

2. A fluid valve comprising, in combination, an external casing, a rotatable inner casing rotatively mounted in the external casing, and a slidable and rotatable plunger mounted in the rotatable inner casing, said casings and plunger having registering port means to control the flow of fluid therethrough, means for rotating the inner casing relative to the slidable and rotatable plunger to vary the port registration, means for sliding and rotating the plunger relative to the inner casing to vary the port registration, said last-mentioned means including a shaft having roller means carried thereby and a race-way having a low place into which the roller means normally resides.

3. A motion transmitting mechanism for moving a second member in accordance with the movements of a first member comprising, in combination, a fluid pressure follower device having a main valve for actuaing the second member, fluid means for actuating the main valve, a pilot valve for governing the operation of the fluid means and the position of the fluid pressure follower device, said pilot valve having two relatively movable parts, means for actuating one of said parts by the said first member, a throttle device for actuating the other of said parts of the pilot valve, and clutch means governed by the movements of the said one of said valve parts to hold the main valve, the fluid pressure follower device and the second member in a fixed position.

4. A motion transmitting mechanism for moving a second member in accordance with the movements of a first member comprising, in combination, a fluid pressure follower device having a main valve for actuating the second member, fluid means for actuating the main valve, a pilot valve for governing the operation of the fluid means and the position of the fluid pressure follower device, means for operating the pilot valve by the said first means, and clutch means responsive to the first means for holding the main valve in a fixed position with reference to the first means.

5. A motion transmitting mechanism for moving a second member in accordance with the movements of a first member comprising, in combination, fluid means having a movable member for actuating the second member, valve means for governing the operation of the fluid means and the position of the second member, actuating means for actuating the valve by the first member, clutch means for connecting the movable member to the first member, and means responsive to the movement of the valve means for disconnecting the clutch means during actuation of the second member by the fluid means.

6. A motion transmitting mechanism for moving a second member in accordance with the movements of a first member comprising, in combination, fluid means having a movable member for actuating the second member, valve means for governing the operation of the fluid means and the position of the second member, actuating means for actuating the valve by the first member, clutch means for connecting the movable member to the first member, and means for disconnecting the clutch means upon actuation of the second member by the fluid means, said clutch means being governed by the actuating means.

7. A motion transmitting mechanism for moving a second member in accordance with the movements of a first member comprising, in combination, fluid means having a movable member for actuating the second member, valve means for governing the operation of the fluid means and the position of the second member, actuating means for actuating the valve by the first member, and clutch means governed by the valve means for connecting the second member to the movable member.

8. A motion transmitting mechanism for moving a second member in accordance with the movements of a first member comprising, in combination, valve means having a movable member, fluid means responsive to the movements of the first member for actuating the movable members clutch means for connecting the movable member to the first member, fluid transmitting means governed by the valve means for connecting the second member to the movable member, and means for disconnecting the clutch means upon actuation of the second member by the fluid transmitting means.

9. A motion transmitting mechanism for moving a second member in accordance with the movements of a first member comprising, in combination, valve means having a movable member, fluid means responsive to the movements of the first member for actuating the movable members clutch means for connecting the movable member to the first member, fluid transmitting means governed by the valve means for connecting the second member to the movable member, and means for disconnecting the clutch means upon actuation of the second member by the fluid transmitting means, said clutch means operating to hold the movable member in a fixed position with respect to the first member.

10. A motion transmitting mechanism for moving a second member in accordance with the movements of a first member comprising, in combination, main valve means having a movable member, clutch means for connecting the movable member to the first member, fluid transmitting means for connecting the second member to the movable member, pilot valve means for governing the main valve means and the fluid transmitting means, and means for actuating the clutch means by the pilot valve means.

11. A motion transmitting mechanism for moving a second member in accordance with the movements of a first member comprising, in combination, main valve means having a movable member, clutch means for connecting the movable member to the first member, fluid transmitting means for connecting the second member to the movable member, pilot valve means for governing the main valve means and the fluid transmitting means, and means for actuating the clutch means by the pilot valve means, said pilot valve means comprising a slidable plunger and said clutch having a part actuated by the said plunger.

12. A motion transmitting mechanism for moving a second member in accordance with the movements of both a first member and a third member comprising, in combination, fluid means for actuating the second member, valve means for governing the operation of the fluid means and the position of the second member, said valve means having two relatively movable parts, first actuating means for actuating one of the valve parts by the first member, second actuating means for actuating the other of the valve parts by the third member, clutch means for connecting the second member to the first member, and means for disconnecting the clutch means upon actuation of the second member by the fluid means.

13. A motion transmitting mechanism for moving a second member in accordance with the movements of both a first member and a third member comprising, in combination, fluid means for actuating the second member, valve means for governing the operation of the fluid means and the position of the second member, said valve means having an external casing, a rotatable inner casing rotatively mounted in the external casing and a slidable and rotatable plunger mounted in the rotatable inner casing, said casings and plungers having registering port means to control the flow of fluid therethrough, first actuating means for slidably and rotatively actuating the said slidable and rotatable plunger by the first member, and second actuating means for rotatively actuating the rotatable inner casing.

14. A motion transmitting mechanism for moving a second member in accordance with the movements of both a first member and a third member comprising, in combination, fluid means for actuating the second member, valve means for governing the operation of the fluid means and the position of the second member, said valve means having an external casing, a rotatable inner casing rotatively mounted in the external casing and a slidable and rotatable plunger mounted in the rotatable inner casing, said casings and plungers having registering port means to control the flow of fluid therethrough, first actuating means for slidably and rotatively actuating the said slidable and rotatable plunger by the first member, second actuating means for rotatively actuating the rotatable inner casing, and clutch means operated by the slidable and rotatable plunger for connecting the second member to the first member.

15. A motion transmitting mechanism for moving a second member in accordance with the movements of both a first member and a third member comprising, in combination, a main valve means having a slidable piston valve, a fluid follower mechanism governed by the main valve means for actuating the second member, fluid means for actuating the said slidable piston valve, rack-and-pinion means movable in accordance with the said slidable piston valve, a pilot valve having a slidable and rotatively mounted plunger and having a rotatively mounted casing surrounding the said plunger, actuating means for slidably and rotatively operating the said plunger by the first member, clutch means interconnecting the said plunger and the rack-and-pinion means, said clutch means being disengageable upon the slidable movements of said plunger, and second actuating means for rotating the said casing by the third member, said plunger and said casing having registering port means for governing the main piston valve, and thus rendering the second member responsive to both the first and the third members.

THOMAS A. BAKER.